April 18, 1961
A. BLOOM
2,979,730
ELBOW LOCKING MECHANISM FOR AN ARTIFICIAL LIMB
Filed Oct. 1, 1959
2 Sheets-Sheet 1
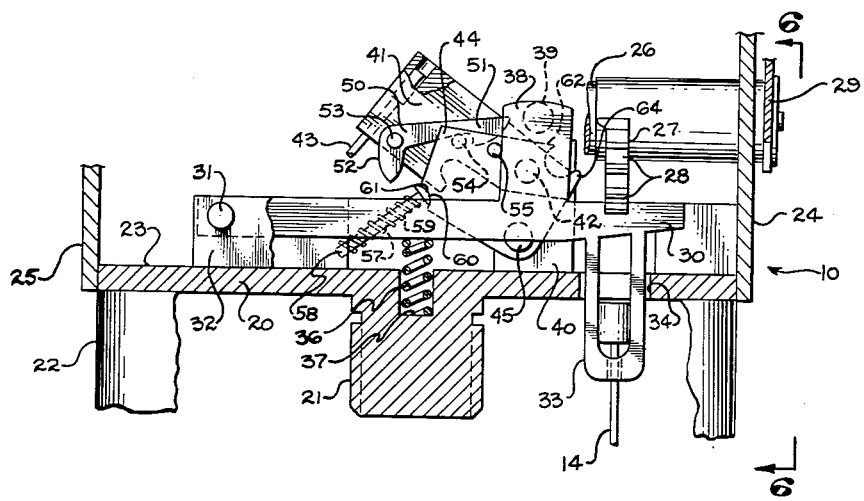
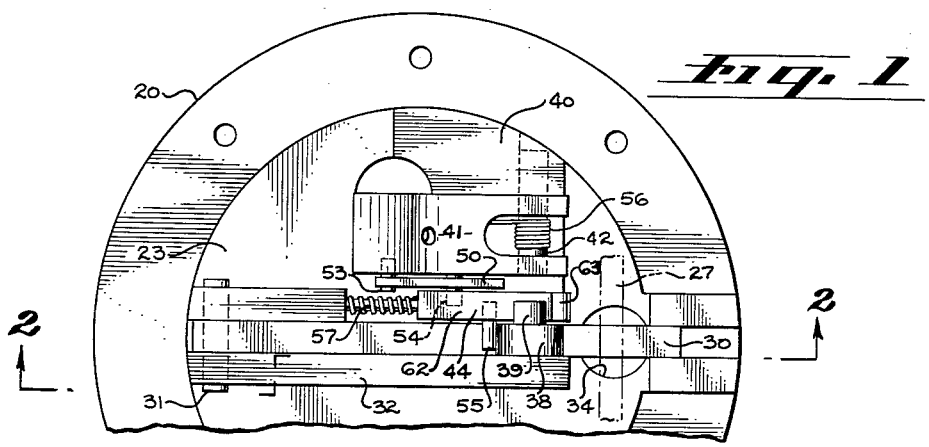
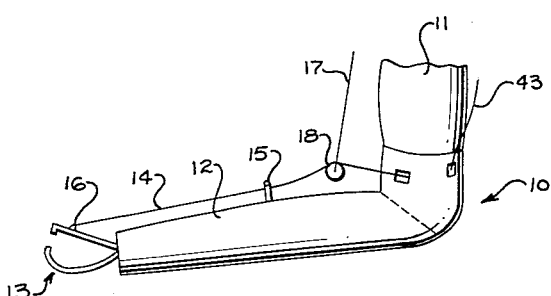
AARON BLOOM
INVENTOR.
BY
Beehler & Shanahan
ATTORNEYS

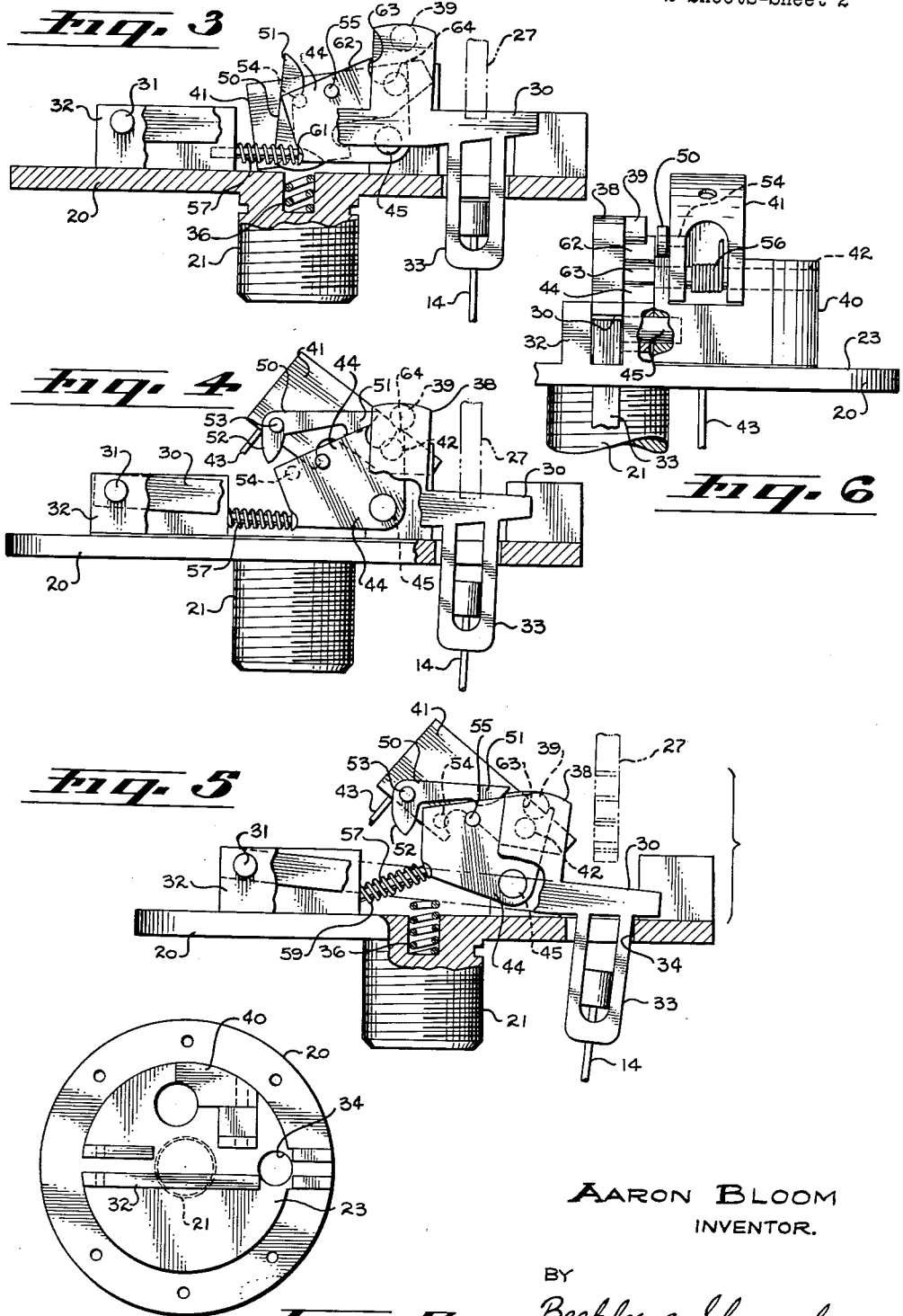

United States Patent Office 2,979,730
Patented Apr. 18, 1961

2,979,730
ELBOW LOCKING MECHANISM FOR AN ARTIFICIAL LIMB

Aaron Bloom, Pasadena, Calif., assignor to Sierra Engineering Company, Sierra Madre, Calif., a corporation Filed Oct. 1, 1959, Ser. No. 843,687
4 Claims. (Cl. 3—12.3)

The invention relates to prosthetics and is especially concerned with a joint for an artificial limb incorporating certain necessary mechanism to selectively lock and unlock the joint by a simple cable attachment, the cable being at the same time one made use of in manipulating the artificial limb to a desired position and also manipulating a terminal device attached to the limb as, for example, an artificial hand or hook.

When an artificial limb such as a leg or arm needs to be substituted for natural limb, the usual mechanical problems present in mechanical devices present themselves in a fashion requiring a solution especially adapted to the problem. In general, when purely mechanical things such as artificial limbs are attached to the natural limb, due to mechanical limitations the user must learn certain substitute motions in order to make the mechanical limb perform. On some occasions the user may be psychologically sensitive to dependence upon an artificial limb and hence to allay such sensitivity the mechanism must be quiet and unobtrusive. It obviously must also be dependable. Moreover, the extra natural movements necessary to manipulate the artificial limb need to be as unobtrusive as possible and also be capable of manipulating the device without excess of unnatural movements or motion.

Although artificial joints for such purposes have in the past met with considerable success, to a large degree they have not met all of the requirements for this special need.

It is therefore among the objects of the invention to provide a new and improved mechanical joint for use with an artificial limb which is quiet and unobtrusive in its action and which nevertheless is positive to a marked degree, making use of the joint particularly dependable.

Another object of the invention is to provide a new and improved prosthetic joint, the parts of which are simply constructed, light in weight, while at the same time rugged to the degree desired in order to assure prolonged and dependable operation.

Still another object of the invention is to provide a new and improved prosthetic joint, the mechanical parts of which are small and light in weight, thereby to permit mounting them in a small space and also avoiding encumbering the joint with any unnecessary weight and bulk.

Still another object of the invention is to provide a new and improved prosthetic joint capable of assuming locked and unlocked positions and moreover so constructed that the locking and unlocking can be accomplished with an exceptional degree of rapidity and also without necessity for moving the operating parts more than a few small fractions of an inch, thereby greatly facilitating the ease of operation of the device.

Still further among the objects of the invention is to provide a new and improved prosthetic joint wherein locking and unlocking of the joint takes place with extreme rapidity and moreover one wherein, after being locked the mechanism can be quickly and simply made ready for unlocking and shifting to a new position.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

Figure 1 is a partial plan view of the device from the side opposite that normally attached to a natural limb.

Figure 2 is a longitudinal sectional view taken on the line 2—2 of Figure 1 showing the parts in locked position.

Figure 3 is a fragmentary longitudinal sectional view similar to Figure 2 but showing the parts in the positions occupied part way through an unlocking cycle.

Figure 4 is a fragmentary longitudinal sectional view similar to Figures 2 and 3 showing the parts at rest in unlocked position.

Figure 5 is a fragmentary longitudinal sectional view similar to Figures 2, 3 and 4 but showing the parts in the positions occupied when the joint is released for movement.

Figure 6 is a fragmentary side elevational view taken on the line 6—6 of Figure 2 but with conventional portions of the device removed for clarity.

Figure 7 is a plan view of the mounting plate with operating parts removed.

Figure 8 is a side elevational view of a prosthetic limb attached to a natural limb showing the usual arrangement of cables to illustrate the environment in which the invention is made use of.

In an embodiment of the invention chosen for the purpose of illustration there is shown an artificial joint, essentially an elbow joint, indicated generally by the reference character 10. As shown in Figure 8, the joint is shown attached to a natural upper arm 11 for mounting thereon a prosthetic forearm 12 at the extremity of which is a terminal device here shown as prosthetic hook 13. An operating cable 14 extends from the joint through a forearm lift loop 15 to a bracket 16 on one side of the terminal device. A harness cable 17 carries a pulley 18 over which the operating cable passes.

The arrangement described is substantially conventional and operated in a well-known fashion; that is to say, when the joint is locked by some appropriate mechanism, the terminal device, such as the hook, can be manipulated by placing tension upon the harness cable 17. Inasmuch as the prosthetic forearm 12 will be immobile at this time when pull is exerted upon the harness cable 17, it will be transmitted to the terminal device. When, however, the joint is unlocked, a pull upon the harness cable 17 acting through the pulley and operating cable 14 will exert a lift upon the forearm lift loop 15 and hence be capable of raising the prosthetic forearm to a different position after which the joint by appropriate mechanism is again locked. The invention here disclosed encompasses a new and improved mechanism for the joint 10.

The embodiment of the specific joint chosen by way of illustration includes a turntable plate 20 provided with a central threaded projection 21 and at the outer edge of which is a flange 22. The projection and flange are ordinarily made use of in attaching the device in a position inverted from that shown in Figure 2 to a jacket, not shown, which is normally fastened to the natural upper arm 11 as, for example, by lacing.

On the opposite side of the turntable plate 20 which is the side 23, as shown in Figure 2, the mechanism comprising the invention is mounted. As previously indicated, this would normally be the lower side.

On the plate are oppositely positioned brackets 24 and 25 which provide means for supporting a shaft 26 upon which is non-rotatably fixed an arcuate rack 27 provided with ratchet teeth 28. The shaft is provided with straps 29 for attachment to the prosthetic forearm 12 in order that the arm may be pivotally moved about the axis of the shaft 26 as a center.

A locking bar 30 is pivotally mounted by means of a pin 31 upon a bracket 32 so that the locking bar can be pivoted into and out of engagement with recesses between the teeth 28. A yoke 33 on the locking bar extends through a hole 34 in the plate 20 and has the operating cable 14 attached thereto. A locking bar return spring 36 mounted in a spring aperture 37 in the plate 20 acts in a direction tilting the locking bar 30 in a counter-clockwise direction, as viewed in Figure 2, for example.

On the upper edge of the locking bar 30, as viewed in Figure 2, is an extension 38 and protruding laterally from the extension near its outer end is a projection 39.

Another bracket 40 located rearwardly, as viewed in Figure 2, supports a lock operating lever 41 by means of a pin 42 which pivotally mounts the lever on the bracket. A control cable 43 serves to manipulate the lock operating lever 41.

A chock, which serves as a blocker 44, is pivotally mounted upon the bracket 40 by means of a pin 45.

On the lock operating lever 41 is a dog 50 at one end of which is a hook 51 and at the other end of which is a cam 52. The dog is pivotally secured upon the lever by means of a pin 53 so that it pivots freely and unrestrictedly. On the blocker 44 is a dog pin 54 which is in a position where it is adapted to be engaged by the hook 51. A stop pin 55 is also mounted upon the blocker 44, the sole purpose of which is to limit movement of the blocker by engagement of the stop pin with the extension 38 when the device is in the locked position illustrated in Figure 2. A torsion spring 56 serves to normally rotate the lock operating lever 41 in a clockwise direction, as viewed in Figure 2.

A toggle pin 57 received in an appropriate spring recess 58 includes a toggle spring 59 acting against a head 60 on the toggle pin. The head 60 is received in a pocket 61 in the lower left corner of the blocker, the pocket and the head being complementarily curved so that as the blocker rotates from one position to another, the head of the toggle pin will follow the blocker under force of the toggle spring 59, the recess 58 being of such size and character as to permit movement of the toggle pin in the usual fashion.

The upper edge of the blocker, as shown in Figures 2 through 5, inclusive, may be identified as a blocking shoulder 62 adjacent which is a reset recess 63.

In operation it may be assumed that in locked position the parts are as illustrated in Figure 2. It will be noted in this position that with the blocker 44 tilted as shown, the blocking shoulder 62 is at a location beneath the projection 39 on the extension 38 of the locking bar 30. In this figure also the locking bar is engaged with the teeth 28 and therefore the shaft 26 is blocked against rotation and accordingly the prosthetic forearm 12 attached thereto is fixed in position.

When it is desired to unlock or unblock the mechanism, a pull is exerted upon the control cable 43 sufficient to tilt the lock operating lever 41 in a counterclockwise direction, as viewed in Figures 2 through 5, inclusive, about the axis of the pin 42. As the lock operating lever is thus tilted, the hook 51 engages the dog pin 54 and the blocker 44 is rotated at the same time in a counterclockwise direction, as viewed in Figures 2 through 5, inclusive, about its pin 45. The parts are moved initially to the position of Figure 3 where it will be noted that the blocking shoulder 62 no longer lies beneath the projection 39. When this motion has been accomplished, the toggle pin 57, which previously was holding the blocker in the position of Figure 2, has now been shifted in its action overcenter relative to the pin 45 and now holds the blocker 44 in the position illustrated in Figure 3. This position, being an intermediate position, still shows the hook 51 in engagement with the dogging pin 54, inasmuch as tension upon the control cable 43 has not yet been relaxed. When the tension is relaxed, however, the torsion spring 56 functions to return the operating lever 41 and the dog 50 to the position illustrated in Figures 2 and 4. The blocker 44, however, will remain in the position illustrated in Figure 4 by virtue of action of the toggle pin. In this position of adjustment, pull exerted upon the operating cable 14 is employed to draw the locking bar 30 downwardly out of engagement with the arcuate rack 27, making the shaft 26 free and thus enabling the prosthetic forearm 12 attached thereto to be moved freely when a pull is exerted upon the harness cable 17.

The cam 52 engages the face 23 of the plate 20 on one extremity of movement of the dog 50 to free the dog from the dog pin 54.

During the same motion as that employed for disengaging the locking bar 30 from the arcuate rack, the projection 39 engages a camming edge 64 of the blocker 44 and rotates the blocker in a clockwise direction, as viewed in Figures 4 and 5, until the projection 39 enters the reset recess 63. The movement just described shifts the position of the pocket 61 and the toggle pin 57 to overcenter position, namely, the positions illustrated in Figures 2 and 5.

When the operating cable 14 is then released, the return spring 36 will return the locking bar 30 in a counter-clockwise direction to its initial position of engagement with the arcuate rack 27. As this takes place, the extension 38 attached thereto moves upwardly, as viewed in Figure 5, and moves with it the projection 39. As the projection 39 leaves the reset recess 63 pressing lightly against the adjacent edge of the recess, the toggle spring 59 yields slightly until the projection is free of the reset recess, after which the toggle spring pressing upon the blocker will return the blocker to the position illustrated in Figure 2, wherein the blocking shoulder 62 thereon will again lie beneath the projection 39 and prevent disengagement of the locking bar from the arcuate ratchet until the mechanism has again been released or unlocked.

From the foregoing description of both mechanism and operation it will be noted that the parts constructed and mounted in the form shown are small enough to occupy only a small portion of the area of the turntable plate 20 and also small enough to be contained between the plate and the shaft 26. The action as noted is simple while at the same time positive incorporating as it does relatively few moving parts and springs. The movements provided are those appropriate to satisfactory manipulation of a prosthetic limb and terminal device in the manner shown and described.

While the invention has herein been shown and described in what is conceived to be the most practical and preferred embodiment, it is recognized that departures may be made therefrom within the scope of the invention, which is not to be limted to the details disclosed herein but is to be accorded the full scope of the claims so as to embrace any and all equivalent devices.

Having described the invention, what is claimed as new in support of Letters Patent is:

1. In a prosthetic joint comprising a first member, a second member pivotally attached to the first member, and an arcuate rack on said second member, the combination of a rack bar having a pivotal mounting on the first member for movement into and out of engagement with said rack, a projection on the bar, a blocker element having a rocker pin pivotally mounting said blocker element on said first member, a blocking shoulder on the blocker element, said blocker element having a first position with said shoulder in blocking position relative to said projection and a second position with said shoulder in unblocking position, and a resilient toggle element acting against said blocker element operative to urge said blocker element alternatively into said positions, a lock operating lever element pivotally mounted on the first member, a first dogging means mounted on one of said elements and a second dogging means on the other of said elements having an operating engagement with said first dogging means during movement of said lever element to a position wherein said blocking shoulder is in unblocking position, said blocker element having a portion receptive of said projection when said bar is out of engagement with said rack whereby said blocker element is tilted away from said unblocking position.

2. In a prosthetic joint comprising a first member, a second member pivotally attached to the first member, and an arcuate rack on said second member, the combination of a rack bar having a pivotal mounting on the first member for movement into and out of engagement with said rack, a projection on said bar, a blocker element having a rocker pin pivotally mounting said blocker element on the first member, a blocking shoulder on the blocker element, said blocker element having a first position with said shoulder in blocking position relative to said projection and a second position with said shoulder in unblocking position, and a resilient toggle element acting between said first member and said blocker element operative to urge said blocker element alternatively into said positions, a lock operating lever element pivotally mounted on the first member, a first dogging means pivotally mounted on the lever element and a second dogging means on the blocker element having an operating engagement with said first dogging means during movement of said lever element to a position wherein said blocking shoulder is in unblocking position, said blocker element having a portion receptive of said projection when said bar is out of engagement with said rack, whereby said blocker element is tilted to a third position intermediate said blocking and unblocking positions, said toggle being operative in said third position upon disengagement of said projection with the portion of said blocker element whereby to reset said blocker element in blocking position.

3. In a prosthetic joint comprising a plate, a fixture pivotally attached to the plate, and an arcuate rack on said fixture, the combination of a rack bar having a pivotal mounting on the plate for movement into and out of engagement with said rack, a projection on the bar, a blocker element having a rocker pin pivotally mounting said blocker element on the plate, a blocking shoulder on the blocker element, said blocker element having a first position with said shoulder in blocking position relative to said projection and a second position with said shoulder in unblocking position, and a resilient toggle element acting between said plate and said blocker operative to urge said blocker alternatively into said positions, a lock operating lever element pivotally mounted on the plate, a dog pivotally mounted on one of said elements and a dogging pin on the other of said elements having an operating engagement with said dog during movement of said lever to a position wherein said blocking shoulder is in unblocking position, said blocker having a portion thereof receptive of said projection when said bar is out of engagement with said rack, whereby said blocker element is tilted to a third position intermediate said blocking and unblocking positions, said toggle being operative in said third position in the same direction as in said first position upon disengagement of said projection with the portion of said blocker element whereby to reset said blocker element in blocking position.

4. In a prosthetic joint comprising a plate adapted for attachment to a natural limb, a prosthetic fixture pivotally attached to the plate and including a terminal device on an axis parallel thereto, and an arcuate rack on said fixture, the combination of a cable actuated rack bar having a pivotal mounting on the plate for spring impelled movement into and out of engagement with said rack, a transverse extension on said bar and having a projection thereon, a blocker having a rocker pin pivotally mounting said blocker on the plate on an axis parallel to said pivotal mounting of the rack bar, a blocking shoulder on the blocker, said blocker having a first position with said shoulder in blocking position relative to said projection and a second position with said shoulder in unblocking position, and a resilient toggle element acting between said plate and said blocker operative to urge said blocker alternately into said positions, a cable controlled lock operating lever pivotally mounted on the plate, a dog pivotally mounted on the lever and a dogging pin on the blocker having an operating engagement with said dog during movement of said lever to a position wherein said blocking shoulder is in unblocking position, and means forming a reset recess on said blocker receptive of said projection when said bar is out of engagement with said rack, whereby said blocker is tilted to a third position intermediate said blocking and unblocking positions, said toggle being operative in said third position in the same direction as in said first position upon disengagement of said projection with said recess whereby to reset said blocker in blocking position.

References Cited in the file of this patent
UNITED STATES PATENTS
2,637,042 Threewit _____ May 5, 1953
FOREIGN PATENTS
750,371 Great Britain _____ June 13, 1956